United States Patent
Miao et al.

(10) Patent No.: US 11,638,264 B2
(45) Date of Patent: Apr. 25, 2023

(54) METHODS AND DEVICES FOR RESOURCE ALLOCATION FOR CONTROL RESOURCE REGION

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 70 days.

(21) Appl. No.: 16/764,740

(22) PCT Filed: Nov. 16, 2017

(86) PCT No.: PCT/CN2017/111422
§ 371 (c)(1),
(2) Date: May 15, 2020

(87) PCT Pub. No.: WO2019/095229
PCT Pub. Date: May 23, 2019

(65) Prior Publication Data
US 2021/0185684 A1 Jun. 17, 2021

(51) Int. Cl.
| | | |
|---|---|---|
| H04W 72/04 | (2009.01) | |
| H04W 56/00 | (2009.01) | |
| H04W 72/00 | (2009.01) | |
| H04W 72/0446 | (2023.01) | |
| H04W 72/0453 | (2023.01) | |

(52) U.S. Cl.
CPC ..... *H04W 72/0493* (2013.01); *H04W 56/001* (2013.01); *H04W 72/005* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2014/0153524 A1* | 6/2014 | Xu | ......... | H04W 24/02 370/329 |
| 2018/0049203 A1* | 2/2018 | Xue | ....... | H04L 5/0035 |

(Continued)

FOREIGN PATENT DOCUMENTS

| | | |
|---|---|---|
| CN | 102340875 A | 2/2012 |
| CN | 103517432 A | 1/2014 |

(Continued)

OTHER PUBLICATIONS

"UE Identity in L1/L2 Downlink Control Signalling", Sharp, R1-061136, 3GPP TSG-RAN WG1#45, May 8-12, 2006, pp. 1-7, Shanghai, China.

(Continued)

*Primary Examiner* — Chirag G Shah
*Assistant Examiner* — Srinivasa R Reddivalam
(74) *Attorney, Agent, or Firm* — Sughrue Mion, PLLC

(57) ABSTRACT

Embodiments of the present disclosure relate to methods, devices and apparatus for resource allocation for a control resource region in a wireless communication system. In an embodiment of the present disclosure, a method may include determining resource units each containing a predetermined number of resource blocks based on available transmission resources. Resource blocks not contained in the resource units are distributed in the available transmission resources to divide resource blocks contained in the resource units into a plurality of resource segments. The method also comprise allocating one or more of the determined resource units to the control resource region and transmitting resource allocation information indicating the allocated one or more of resource units. With embodiments of the present disclosure, there is provided an effective solution for resource allocation for control resource region.

18 Claims, 11 Drawing Sheets

(56) References Cited

U.S. PATENT DOCUMENTS

| | | | | |
|---|---|---|---|---|
| 2018/0083755 | A1* | 3/2018 | Xue | H04L 5/0092 |
| 2019/0305924 | A1* | 10/2019 | Kim | H04L 5/0064 |
| 2020/0112877 | A1* | 4/2020 | Xue | H04W 72/042 |
| 2020/0244419 | A1* | 7/2020 | Manolakos | H04L 5/0051 |
| 2020/0314845 | A1* | 10/2020 | Miao | H04L 5/0044 |
| 2020/0374036 | A1* | 11/2020 | Seo | H04L 5/0048 |
| 2021/0092008 | A1* | 3/2021 | Yi | H04L 5/0005 |

FOREIGN PATENT DOCUMENTS

| | | |
|---|---|---|
| CN | 103548402 A | 1/2014 |
| WO | 2013023363 A1 | 2/2013 |

OTHER PUBLICATIONS

"RB-group based DL LVRB allocation", LG Electronics, R1-073478, 3GPP TSG RAN WG1 #50, Aug. 20-24, 2007, pp. 1-3, Athens, Greece.

"Coresets for NR PDCCH", Intel Corporation, R1-1710543, 3GPP TSG RAN WG1 NR Adhoc Jun. 27-30, 2017, pp. 1-5, Qingdao, P.R. China.

"Coreset Configurations", Samsung, R1-1710693, 3GPP TSG RAN WG1 NR ad-Hoc#2, Jun. 27-30, 2017, pp. 1-3, Qingdao, China.

International Search Report for PCT/CN2017/111422 dated Aug. 2, 2018 (PCT/ISA/210).

Written Opinion for PCT/CN2017/111422 dated Aug. 2, 2018 (PCT/ISA/237).

Motorola Mobility, Lenovo, "On resource allocation RBG size", 3GPP TSG RAN WG1 #90bis, R1-1718703, Prague, Czech Republic, Oct. 9-13, 2017 (3 pages total).

ETRI, "Discussion on configuration of search space and Coreset", 3GPP TSG RAN WG1 #89, R1-1708100, Hangzhou, China, May 15-17, 2017 (3 page total).

CATT, "Further details of common control signaling", 3GPP TSG RAN WG1 Meeting #88, R1-1702091, Athens, Greece, Feb. 13-17, 2017 (5 pages total).

Notification of Reasons for Refusal dated Aug. 17, 2021 from the Japanese Patent Office in JP Application No. 2020-526604.

* cited by examiner

Fig. 3A            Fig. 3B            Fig. 3C

Table 7.1.6.1-1 RBG size

| System Bandwidth $N_{RB}^{DL}$ | RBG Size ($P$) |
|---|---|
| ≤10 | 1 |
| 11 – 26 | 2 |
| 27 – 63 | 3 |
| 64 – 110 | 4 |

Table 7.4.3.1-1: Resources within an SS/PBCH block for PSS, SSS, PBCH, and DM-RS for PBCH

| Channel or signal | OFDM symbol number $l$ | Subcarrier number $k$ |
|---|---|---|
| PSS | 0 | 80, 81, ..., 206 |
| SSS | 2 | 80, 81, ..., 206 |
| PBCH | 1, 3 | 0, 1, ..., 287 |
| DM-RS for PBCH | 1, 3 | $0+v, 4+v, 8+v, ..., 280+v, 284+v$<br>$v = N_{ID}^{cell} \bmod 4$ |

| m/case | $N_{RB}^{SS}$ |
|---|---|
| {3,5,9,11}/ case 2,4 | 24 |
| {2,4,8,10}/ case 1,3 | 12 |
| {0,1,6,7,12,13}/other | 0 |

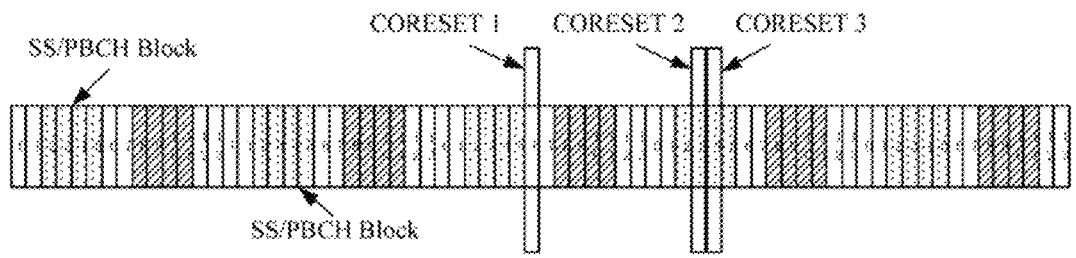
Fig. 11
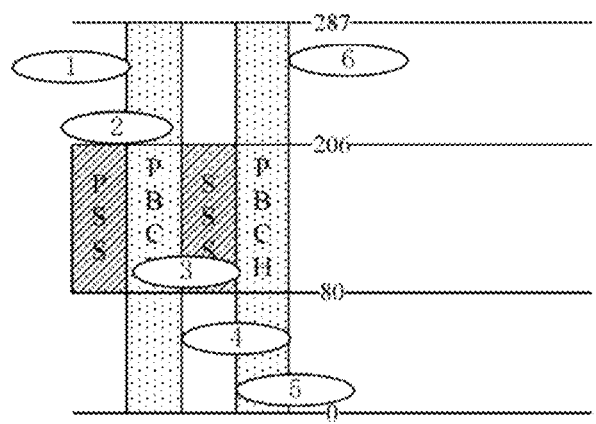
Fig. 12
| m/case | $N_{RB}^{SS}$ |
|---|---|
| Case 1 | 12 |
| Case 2, 3, 4, 5 | 24 |
| other | 0 |
Fig.13

| m/case | $N_{RB}^{SS}$ |
|---|---|
| Case 1 | 12 |
| Case 2, 3, 4, 5, 6 | 24 |
| other | 0 |

METHODS AND DEVICES FOR RESOURCE ALLOCATION FOR CONTROL RESOURCE REGION

This application is a National Stage of International Application No. PCT/CN2017/111422 filed Nov. 16, 2017, the disclosure of which is incorporated herein in its entirety by reference.

FIELD OF THE INVENTION

The non-limiting and exemplary embodiments of the present disclosure generally relate to the field of wireless communication techniques, and more particularly relate to methods, devices and apparatuses for resource allocation of control resource region.

BACKGROUND OF THE INVENTION

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

Recently, it was already agreed that the NR system may re-use NR downlink (DL) Resource Allocation (RA) type 0, same as resource allocation type 0 used in the 3GPP Long-Term Evolution (LTE) system, but in a unit of 6 resource blocks (RBs). Meanwhile no restriction is imposed on the maximum number of segments for a give control resource set (CORESET) when the CORESET is configured by at least UE-specific RRC signaling.

In the Release 15, there is at most one active DL bandwidth part (BWP) and at most one active uplink (UL) BWP at a given time for a serving cell, and the number of DL RBs within the DL BWP may or may not be a multiple of 6RBs.

In addition, unlike the Physical Downlink Control Channel (PDCCH) in the LTE system, for mini-slot based scheduling, the start symbol of a CORESET may be any symbol in a slot, which might be collided with Synchronization Signal (SS) block.

Thus, there is a need for new resource allocation for control resource region in the NR system.

SUMMARY OF THE INVENTION

To this end, in the present disclosure, there is provided a new solution of resource allocation for a control resource region in a wireless communication system, to mitigate or at least alleviate at least part of the issues in the prior art.

According to a first aspect of the present disclosure, there is provided a method for resource allocation for a control resource region. The method may be performed at a network device, for example eNB, or other like network devices. The method may comprise determining resource units each containing a predetermined number of resource blocks based on available transmission resources, wherein resource blocks not contained in the resource units are distributed in the available transmission resources to divide resource blocks contained in the resource units into a plurality of resource segments; allocating one or more of the determined resource units to the control resource region; and transmitting resource allocation information indicating the allocated one or more of resource units.

According to a second aspect of the present disclosure, there is provided a method for determining resources allocated to a control resource region. The method can be performed at a terminal device, for example UE, or other like terminal devices. The method may comprise receiving resource allocation information indicating resources allocated to the control resource region; determining resource units each containing a predetermined number of resource blocks based on available transmission resources, wherein resource blocks not contained in the resource units are distributed in the available transmission resources to divide resource blocks contained in the resource units into a plurality of resource segments; and determining resource units allocated to the control resource region based on the resource allocation information and the determined resource units.

According to a third aspect of the present disclosure, there is provided a network device. The network device may comprise a processor configured to determine resource units each containing a predetermined number of resource blocks based on available transmission resources, wherein resource blocks not contained in the resource units are distributed in the available transmission resources to divide resource blocks contained in the resource units into a plurality of resource segments and allocate one or more of the determined resource units to the control resource region. The network device further comprises a transceiver configured to transmit resource allocation information indicating the allocated one or more of resource units.

According to a fourth aspect of the present disclosure, there is provided a terminal device. The terminal device may comprise a transceiver configured to receive resource allocation information indicating resources allocated to the control resource region. The terminal device may further comprise a processor configured to determine resource units each containing a predetermined number of resource blocks based on available transmission resources, wherein resource blocks not contained in the resource units are distributed in the available transmission resources to divide resource blocks contained in the resource units into a plurality of resource segments; and determine resource units allocated to the control resource region based on the resource allocation information and the determined resource units.

According to a fifth aspect of the present disclosure, there is provided a network device. The network device may comprise a processor and a memory. The memory may be coupled with the processor and having program codes therein, which, when executed on the processor, cause the network device to perform operations of the first aspect.

According to a sixth aspect of the present disclosure, there is provided a terminal device. The terminal device may comprise a processor and a memory. The memory may be coupled with the processor and have program codes therein, which, when executed on the processor, cause the terminal node to perform operations of the second aspect.

According to a seventh aspect of the present disclosure, there is provided a computer-readable storage media with computer program codes embodied thereon, the computer program codes configured to, when executed, cause an apparatus to perform actions in the method according to any embodiment in the first aspect.

According to an eighth aspect of the present disclosure, there is provided a computer-readable storage media with computer program codes embodied thereon, the computer program codes configured to, when executed, cause an apparatus to perform actions in the method according to any embodiment in the second aspect.

According to a ninth aspect of the present disclosure, there is provided a computer program product comprising a computer-readable storage media according to the seventh aspect.

According to a tenth aspect of the present disclosure, there is provided a computer program product comprising a computer-readable storage media according to the eighth aspect.

With embodiments of the present disclosure, there is provided an effective solution for resource allocation for control resource region.

BRIEF DESCRIPTION OF THE DRAWINGS

The above and other features of the present disclosure will become more apparent through detailed explanation on the embodiments as illustrated in the embodiments with reference to the accompanying drawings, throughout which like reference numbers represent same or similar components and wherein:

FIG. 3A schematically illustrates an example division of RBs contained in resource units by leftover RBs according to an embodiment of the present disclosure;

FIG. 3B schematically illustrates another example division of RBs contained in resource units by leftover RBs according to an embodiment of the present disclosure;

FIG. 3C schematically illustrates a further example division of RBs contained in resource units by leftover RBs according to an embodiment of the present disclosure;

FIG. 11 schematically illustrates example CORESET resource allocation in the time domain according to an embodiment of the present disclosure;

FIG. 12 schematically illustrates possible collision conditions between a two-symbol CORESET and an SS/PBCH block according to an embodiment of the present disclosure;

FIG. 13 schematically illustrates an example table for the number of RBs occupied by the SS/PBCH block for different collision cases according to an embodiment of the present disclosure;

DETAILED DESCRIPTION OF EMBODIMENTS

Hereinafter, the solution as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, user equipment (UE) may refer to a terminal, a Mobile Terminal (MT), a subscriber station, a portable subscriber station, Mobile Station (MS), or an Access Terminal (AT), and some or all of the functions of the UE, the terminal, the MT, the SS, the portable subscriber station, the MS, or the AT may be included. Furthermore, in the context of the present disclosure, the term "BS" may represent, e.g., a node B (NodeB or NB), an evolved NodeB (eNodeB or eNB), gNB (next generation Node B), a radio header (RH), a remote radio head (RRH), a relay, or a low power node such as a femto, a pico, and so on.

Figure 1:
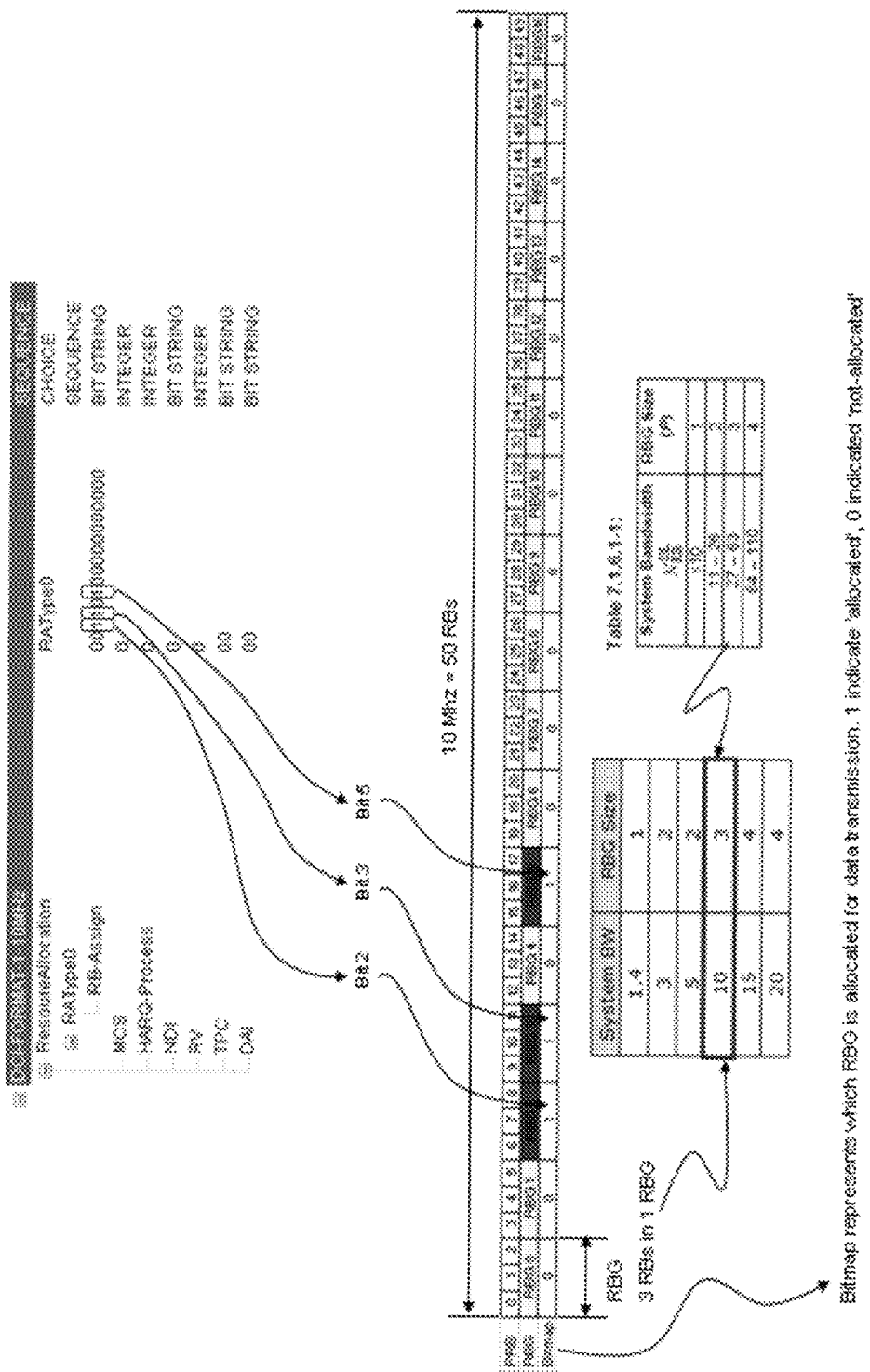
FIG. 1 schematically illustrates resource allocation type 0 in the LTE system.

For illustrative purposes, FIG. 1 illustrates a diagram showing the resource allocation (RA) Type 0 in the LTE system. As illustrated in FIG. 1, RA Type 0 is used for DL resource allocation. In Downlink Control Information (DCI) Format 1 for 10 MHz, a bitmap of 17 bits is used to indicate resource assignment, wherein each bit corresponds to a resource block group (RBG) and indicates whether the RBG is allocated or not, as illustrated by Bit 2, Bit 3 and Bit 5 in FIG. 1. In the LTE system with a 10 MHz system bandwidth, the system bandwidth contains 50 resource blocks, and is divided into 17 RBG each containing 3 RBs except the last one. The number of RBs in the RBG, which is also called RBG size, is dependent on the system bandwidth, i.e., the number of RBs. From FIG. 1, it can be seen that the allocated resource may be a multiple of 6RBs but it may not be a multiple of 6RBs either. In addition, the last RBG contains only 2 RBs, which does not meet requirements on the unit of 6 RBs for CORESET resource allocation in the NR system as well.

To this end, in the present disclosure, there is proposed a new solution for resource allocation for a control resource region, which could mitigate or at least alleviate at least part of the issues in the prior art. Hereinafter, reference will be further made to FIGS. 2 to 21 to describe the solutions as proposed in the present disclosure in details. However, it shall be appreciated that the following embodiments are given only for illustrative purposes and the present disclosure is not limited thereto.

Figure 2:
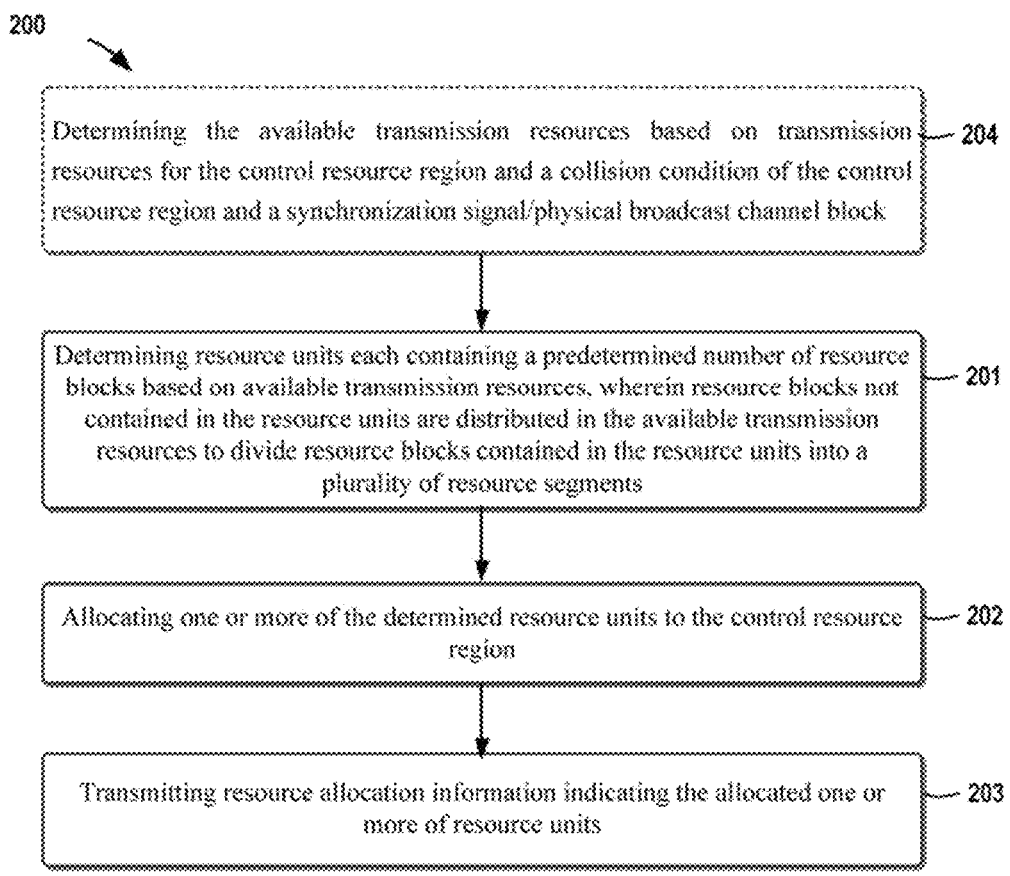
FIG. 2 schematically illustrates a flow chart of a method of resource allocation for a control resource region in a wireless communication system according to an embodiment of the present disclosure.

FIG. 2 schematically illustrates a flow chart of a method 200 of resource allocation for control resource region in a wireless communication system according to an embodiment of the present disclosure. The method 200 may be performed at a network device, for example eNB, or other like network devices.

As illustrated in FIG. 2, in step 201, the network device may determine resource units based on available transmission resources. Each of the resource units contain a predetermined number of resource blocks (for example 6RBs) and resource blocks not contained in the resource units can be distributed in the available transmission resources to divide resource blocks contained in the resource units into a plurality of resource segments.

The term "resource unit" used herein may refer to a basic unit which is used during the resource allocation and the allocated resource could be a plurality of the resource unit but cannot be only a part thereof. The resource unit, as a basis unit, may contain a predetermined number of resource blocks. For example, the predetermined number could be 6 so as to meet requirements for CORESET resource allocation the NR system.

In addition, the total number of resource blocks contained in the bandwidth part (BWP) may not be the multiple of 6 RBs. For example, in the LTE system with 10 MHz, the system bandwidth comprises 50 RBs and the last one RBG contains only 2 RBs. In addition, in the NR system, the maximum number and the minimum number of resource blocks are defined, but the RB number in BWP could be configured for different cells. For example, the RB number in BWP can be any number in the allowable number range, or could be any of predetermined values in the allowable number range. Thus, there is a high possibility that the RB number in the BWP is not a multiple of 6RBs. However, in the NR system, the CORESET resource allocation is performed in a unit of 6RBs, which means RBG with other numbers of RBs cannot be allocated to the control resource region.

To address this problem, in the present disclosure, it is proposed to exclude these RBs that cannot form an RBG as required from resource allocation. In other words, there might be some leftover RBs not used for resource allocation and thus not contained in any of resource units. The RBs not contained in the resource units may be distributed in the available transmission resources to divide resource blocks contained in the resource units into a plurality of resource segments. In other words, those RBs not contained in the resource units are not concentrated together but separated with each other but used as dividers to split other RBs into a plurality of resource segments. In such a way, it is possible to obtain frequency distribution gain.

The number m of the leftover RB can be determined based on the available transmission resource and the predetermined number of RBs contained in a resource unit. For example, m can be calculated by:

$$m = N_{RB}^{CORESET} \bmod 6 \qquad \text{(Equation 1)}$$

wherein $N_{RB}^{CORESET}$ represents the number of available RB in the BWP. The m resource blocks not contained in the resource units can be distributed over the BWP in any suitable manner. Preferably, the m resource blocks not contained in the resource units can be uniformly distributed in the available transmission resources. That is to way, the m resource blocks not contained in the resource units may be used as dividers to divide those RBs contained in the resource units into (m+1) equal length segments.

In an embodiment of the present disclosure, the index Dj of divider j among the m leftover divider could be determined as $$D_j = (j+1) * \lfloor N_{RB}^{CORESET}/(m+1) \rfloor + j, \; j = 0, \ldots, m-1 \qquad \text{(Equation 2)}$$

wherein j denotes the serial number of the divider, Dj denotes the index of divider j; and "$\lfloor \; \rfloor$" indicates a round down operation.

Figures 3A, 3B, 3C:
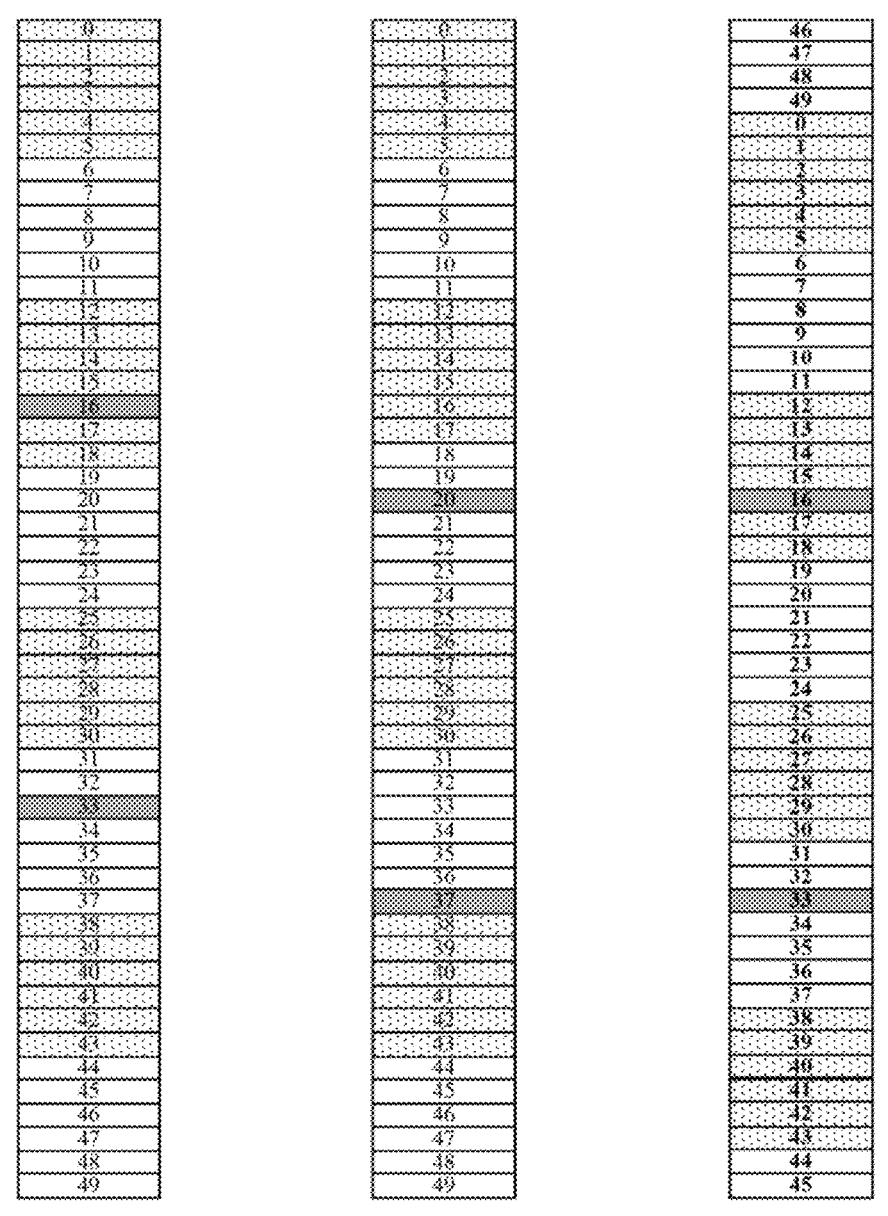

For illustrative purposes, FIG. 3A schematically illustrates an example division of resource blocks (RBs) contained in resource units by leftover (RBs) according to an embodiment of the present disclosure. As illustrated in FIG. 3A, for 50 RBs, there are two leftover RBs which are determined as RBs 16 and 33, and thus divide those contained in the resource unit into three equal-length segments.

It shall be noticed that although the resource units can be determined at network device for all possible RBs number in the BWP by using the above equations, the present disclosure is not limited thereto. It is also possible to set several predetermined resource unit patterns for several predetermined RB numbers. In such case, the network device can learn the resource unit patterns once it learns the RB number of the BWP, without defining them by means of these equations.

In addition, it is also possible to perform some cyclic shift operation on the indices Dj or a start resource block index on the BWP to obtain further frequency selection gain. The cyclic shifting can be performed based on, for example, at least one of, Radio Network Temporary Identity (RNTI), cell Identity (ID), subframe number, slot number, symbol index, and etc. For illustrative purposes, FIGS. 3B and 3C schematically illustrates two cyclic shift examples according to embodiments of the present disclosure.

As illustrated in FIG. 3B, different from FIG. 3A, the indices of the two leftover RBs are cyclic shifted by four RBs and thus the leftover RBs changes from RBs 16 and 33 to RBs 20 and 37. In FIG. 3C, the start RB index of the PBW are cyclic shifted back by four RBs instead of the indices of the two leftover RBs, and the start RB index change from RB 0 to RB 46.

Reference is made back to FIG. 2, in step 202, the network may allocate one or more of the determined resource units to the control resource region. In an embodiment of the present disclosure, the resource allocation can be based on a resource group size for the control resource region, wherein the resource group size is determined based on the available transmission resources. In the LTE system, the RBG size varies over different system bandwidths as given in Table 7.1.6.1-1 in TS 36.213 (see FIG. 4). Thus, in the NR system, the resource allocation can be based on the resource group size as well, wherein the resource group size is determined based on the available transmission resources. For example, it can revise the RBG size table as illustrated in FIG. 4 by means of scaling up.

Figures 4, 5:
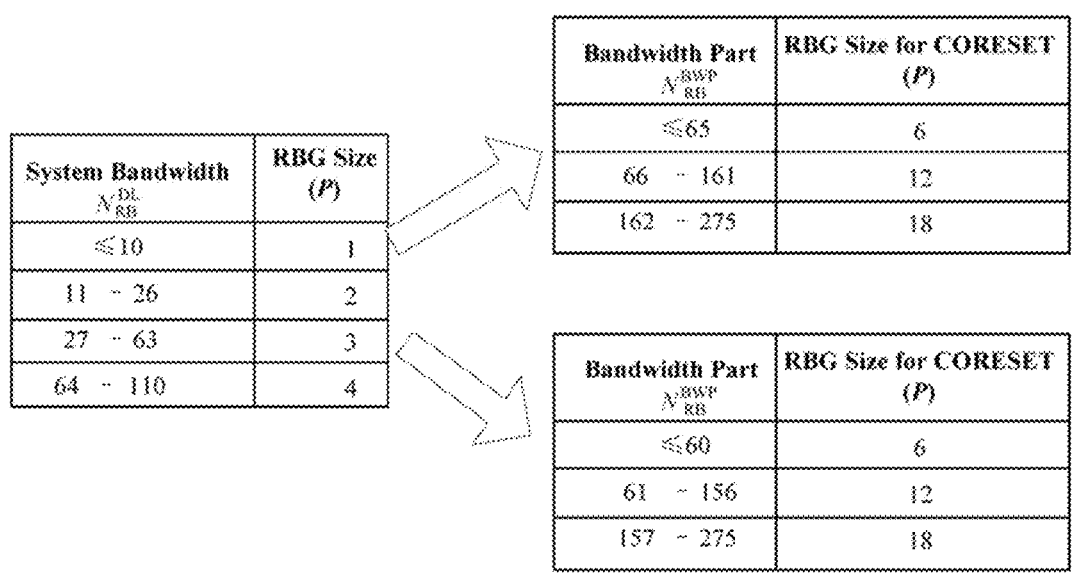
FIG. 4 schematically illustrates a RBG size table in the LTE system.
FIG. 5 schematically illustrates two example RBG size tables for a CORESET according to an embodiment of the present disclosure.

FIG. 5 illustrates two example RBG size tables for CORESET according to embodiments of the present disclosure. As illustrated in FIG. 5, the lower limits of the system bandwidth and the RBG size can be scaled up by 6 and then the upper right table in FIG. 5 can be obtained. Or alternatively, the upper limits of the system bandwidth and the RBG size can be scaled up by 6 and then the lower right table in FIG. 5 can be obtained. The upper limits of the system bandwidth are 275 RB as given in Table 4.4.2-1 in 3GPP TS 38.211. Thus, during resource allocation for the CORESET, it may use any of two tables to determine the RBG size. It shall be noticed herein the RBG size is the number of the RBs in a RBG; however, it can also represent the number of resource units in a RBG and in such a case, it is unnecessary to scale up the RBG size in the table as illustrated in FIG. 4.

Figures 6, 7:
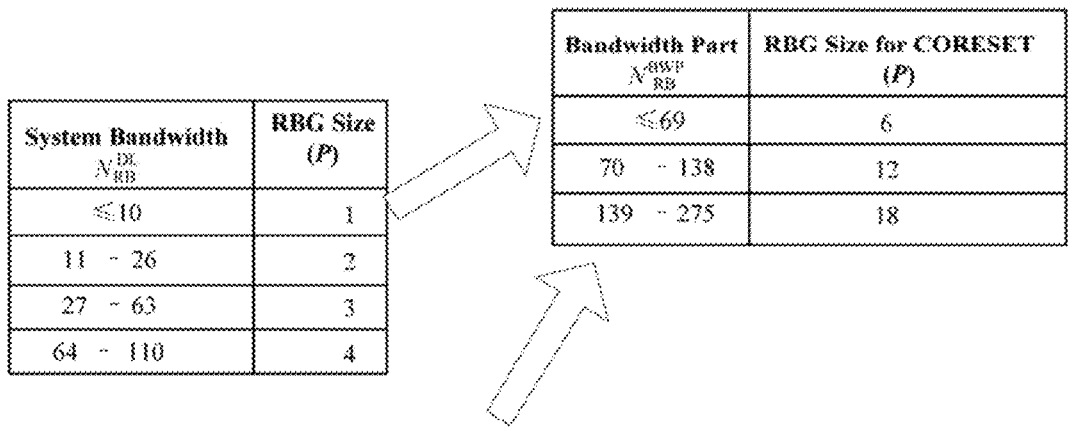
FIG. 6 schematically illustrates a further example RBG size table for a CORESET according to an embodiment of the present disclosure.
FIG. 7 schematically illustrates a still further example RBG size table for a CORESET according to an embodiment of the present disclosure.

In addition, in the NR system, for different kinds of subcarrier spacing, the maximum number and minimum number of RBs might be also different. Thus, it is possible to further modify the two tables as illustrated in FIG. 5. For illustrative purposes, FIG. 6 schematically illustrates a further example RBG size for CORESET table according to an embodiment of the present disclosure. As illustrated in FIG. 6, the lower and upper limits are further modified by means of the maximum number of the RBs as given in Table 4.4.2-1 in 3GPP TS 38.211. In other words, the upper limit in the first row is changed to 69 and the upper limit of the send row is changed to 138, wherein 69 and 138 are respectively the maximum numbers of RB for the subcarrier scaling factor $\mu=4$ and $\mu=5$, respectively.

Moreover, it is also possible to set a constant RBG size for different numbers of RBs. For example, the RBG size can equal to the number of RBs contained in a resource unit. In other words, the RBG size is the same as the resource unit size. FIG. 7 schematically illustrates a still further example RBG size table according to an embodiment of the present disclosure, wherein the RBG size is 6 for any number of the RBs.

With any of tables as given in FIGS. 5 to 7, the RBG size can be determined and the network device may allocate resource units to a CORESET according to the RBG size. It can be understood that it may reduce the overhead of resource allocation indication by using different RBG size, which will be detailed in the following context.

Next reference is made back to FIG. 2 and in step 203, the network device may transmit resource allocation information indicating the allocated one or more of resource units to a terminal device. The resource allocation information may use a bitmap as did in the LTE system. However, different from the bitmap in the LTE system, the bit number might be smaller than those used in the LTE system. In addition, if different RBG sizes are used, bitmap with different size can be used. In such case, each bit may correspond to an RBG instead of a resource unit, which will further reduce the size of bitmap when the RGB contains more RGs than 6.

In addition, as also mentioned in background, the CORESET might be collided with Synchronization Signal (SS)/PBCH block. In the present disclosure, it is further proposed to address potential collisions during resource allocation. As illustrated in step 204, the network device may determine the available transmission resources based on to-be used transmission resources in bandwidth part and a collision condition of the control resource region and an SS block. In other words, the resource used for SS/PBCH block transmission will not be considered as the transmission for the control resource region.

Figures 8, 9, 10:
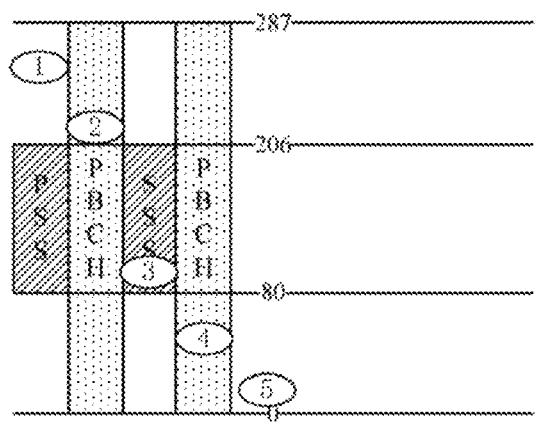
FIG. 8 schematically illustrates resources within SS/PBCH block in the time domain.
FIG. 9 schematically illustrates possible collision conditions between a one-symbol CORESET and an SS/PBCH block according to an embodiment of the present disclosure.
FIG. 10 schematically illustrates an example table for the number of RBs occupied by an SS/PBCH block for different collision cases according to an embodiment of the present disclosure.

The SS/PBCH blocks consists of 4 symbols in the time domain, numbering in increasing order from 0 to 3 within the SS/PBCH blocks, wherein Primary Synchronization Signal (PSS), Secondary Synchronization Signal (SSS) and Physical Broadcast Channel (PBCH) occupy different symbols. As illustrated in FIG. 8, PSS and SSS occupy symbols 0 and 2; and PBCH occupies symbols 1 and 3.

In addition, for different subcarrier spacing, possible start positions of the SS/PBCH blocks are different. For illustrative purposes, a brief description will be given to OFDM symbols of the candidate SS/PBCH blocks for different kinds of subcarrier spacing:

15 KHz subcarrier spacing: the first OFDM symbols of the candidate SS/PBCH blocks have indices of {2, 8}+14*n. For carrier frequencies smaller than or equal to 3 GHz, n=0, 1. For carrier frequencies larger than 3 GHz and smaller than or equal to 6 GHz, n=0, 1, 2, 3

30 KHz subcarrier spacing: the first OFDM symbols of the candidate SS/PBCH blocks have indices of {4, 8, 16, 20}+28*n. For carrier frequencies smaller than or equal to 3 GHz, n=0. For carrier frequencies larger than 3 GHz and smaller than or equal to 6 GHz, n=0, 1

60 KHz subcarrier spacing: the first OFDM symbols of the candidate SS/PBCH blocks have indices of {2, 8}+14*n. For carrier frequencies smaller than or equal to 3 GHz, n=0, 1. For carrier frequencies larger than 3 GHz and smaller than or equal to 6 GHz, n=0, 1, 2, 3

120 KHz subcarrier spacing: the first OFDM symbols of the candidate SS/PBCH blocks have indices of {4, 8, 16, 20}+28*n. For carrier frequencies larger than 6 GHz and smaller than or equal to 6 GHz, n=0, 1, 2, 3, 5, 6, 7, 8, 10, 11, 12, 13, 15, 16, 17, 18

240 KHz subcarrier spacing: the first OFDM symbols of the candidate SS/PBCH blocks have indices of {8, 12, 16, 20, 32, 36, 40, 44}+56*n. For carrier frequencies larger than 6 GHz, n=0, 1, 2, 3, 5, 6, 7, 8

Hereinafter, 15 KHz subcarrier space will be taken as an example for illustrating the collision avoidance solution; however, the skilled in the art can understand that the present disclosure can be applied to any other subcarrier space in a similar way. Reference will be made to FIGS. 9 to 11 to illustrate the collision avoidance solution wherein the CORESET occupies only one symbol.

As illustrated in FIG. 9, for the CORESET of one symbol, there are five collision conditions. Case 1 is a condition that the CORESET is located in symbol 0 within the SS/PBCH block and thus collides with PSS, case 2 is a condition that the CORESET is located in symbol 1 within the SS/PBCH block and thus collides with the first PBCH, case 3 is a condition that the CORESET is located in symbol 2 within the SS/PBCH block and thus collides with SSS, case 4 is a condition that the CORESET is located in symbol 3 within the SS/PBCH block and thus collides with a second PBCH, and case 5 is a condition that no collision occurs between CORESET and the SS/PBCH block. For different collision conditions, the possibly collided frequency resources are different and thus the RB resources required to be avoided are different too.

In an embodiment of the present disclosure, a table can be given to list the number of the RB resources required to be avoided for different collision cases. For illustrative purposes, FIG. 10 illustrates a table of the number of the RB resources occupied by the SS/PBCH block for different collision cases according to an embodiment of the present disclosure. As illustrated in FIG. 10, for case 2, or 4, i.e., the CORESET being located within symbol 3, 5, 9, 11, the number of RBs occupied by SS/PBCH block is 24; for case 1 or 3, i.e., the CORESET being located within in symbol 2, 4, 8, 10, the number of RBs occupied by SS/PBCH block is 12; while for other case like case 5, i.e., the CORESET being located within symbol 0, 1, 6, 7, 12, 13, there is no collision, and thus the number of RBs occupied by SS/PBCH block is zero.

FIG. 11 schematically illustrates an example CORESET resource allocation in the time domain according to an embodiment of the present disclosure. As illustrated in FIG. 11, the SS/PBCH block may start from either symbol 2 or symbol 8 in a subframe. In FIG. 11, CORESET 1 is located in symbol 6 and thus there is no collision, while CORESET 2 and CORESET 3 are located within symbol 3 and 4, which corresponds to case 2 and case 3. In such a case, the available transmission resources may be determined based on transmission resources in bandwidth part and a collision condition of the control resource region and an SS block by means of Table in FIG. 10.

For example, for each of CORESETs 1 to 3, the network device may refer to the table as illustrated in FIG. 10 to determine the resource occupied by the SS/PBCH block and further determine the available transmission resources for CORESET by excluding the resource occupied by the SS/PBCH block from the BWP. For example, the available resource $N_{RB}^{CORESET}$ for the CORESET in the frequency domain can be determined as:

$$N_{RB}^{CORESET} = N_{RB}^{BWP} - N_{RB}^{SS}, \quad \text{(Equation 3)}$$

wherein $N_{RB}^{BWP}$ denotes the bandwidth (i.e., the RB number) of BWP and $N_{RB}^{SS}$ denotes the RB number occupied by the SS/PBCH block which can be obtained from table as illustrated in FIG. 10.

FIGS. 12 to 15 schematically illustrate the collision avoidance solution wherein the CORESET occupies two symbols. As illustrated in FIG. 12, for the CORESET of two symbols, there are six collision conditions. Case 1 is a condition that the CORESET starts from the symbol before symbol 0 within the SS/PBCH block and thus collides with only PSS, case 2 is a condition that the CORESET starts from symbol 0 within the SS/PBCH block and thus collides with both PSS and the first PBCH, case 3 is a condition that the CORESET starts from symbol 1 within the SS/PBCH block and thus collides with both the first PBCH and the SSS, case 4 is a condition that the CORESET start from symbol 2 within the SS/PBCH block and thus collides with the SSS and the second PBCH, case 5 is a condition that the CORESET start from symbol 3 within the SS/PBCH and thus collides with only the second PBCH, and case 6 is a condition that no collision occurs between CORESET and the SS/PBCH block.

Similarly, a table can be given to list the number of the RB resources occupied by the SS/PBCH block for different collision cases. For illustrative purposes, FIG. 13 illustrates a table of the number of the RB resources occupied by the SS/PBCH block for different collision cases according to an embodiment of the present disclosure. As illustrated in FIG. 13, for case 1, i.e., the CORESET colliding with only PSS, the number of RBs occupied by SS/PBCH block is 12; for case 2 to 5, i.e., the CORESET colliding with at least one PBCH, the number of RBs occupied by SS/PBCH block is 24, for other cases of no collision, like case 6, the number of RBs occupied by SS/PBCH block is zero.

Figure 14:
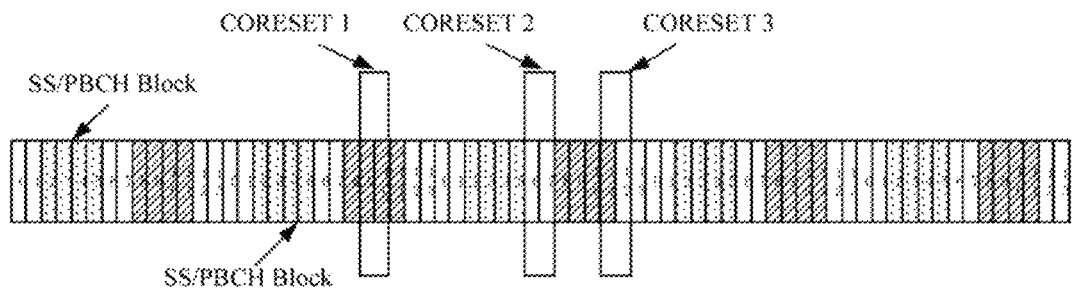
FIG. 14 schematically illustrates example CORESET resource allocation in the time domain according to an embodiment of the present disclosure.

FIG. 14 schematically illustrates an example CORESET resource allocation in the time domain according to an embodiment of the present disclosure. As illustrated in FIG. 14, CORESET 1 occupies symbols 9 and 10, which corresponds to case 3, CORESET 2 occupies symbols 6 and 7 and thus there is no collision, and CORESET 3 occupies symbols 11 and 12, which corresponds to case 5. Similarly, for each of CORESETs 1 to 3, the network device may refer to the table as illustrated in FIG. 13 to determine the resource occupied by the SS/PBCH block and further determine the available transmission resources for CORESET by excluding the resource occupied by the SS/PBCH block from the BWP.

Figure 15:
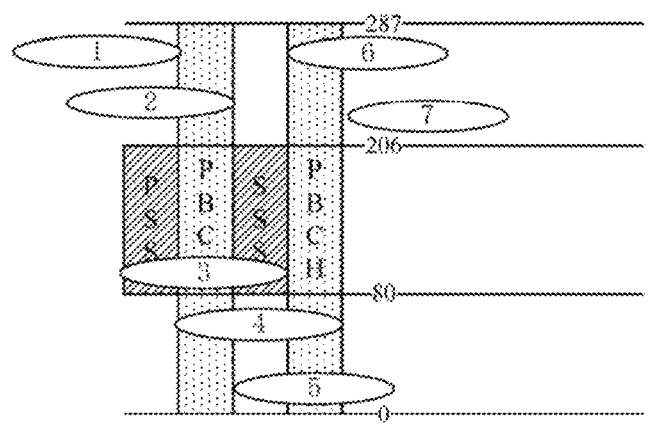
FIG. 15 schematically illustrates possible collision conditions between a three-symbol CORESET and an SS/PBCH block according to an embodiment of the present disclosure.
Figure 16:
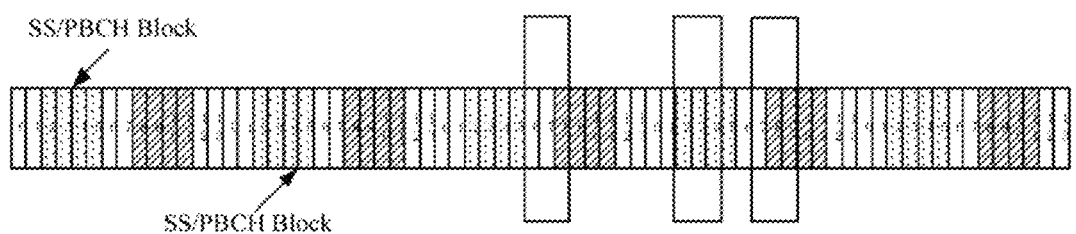
FIG. 16 schematically illustrates an example table for the number of RBs occupied by a SS/PBCH block for different collision cases according to an embodiment of the present disclosure.
Figures 17, 18:
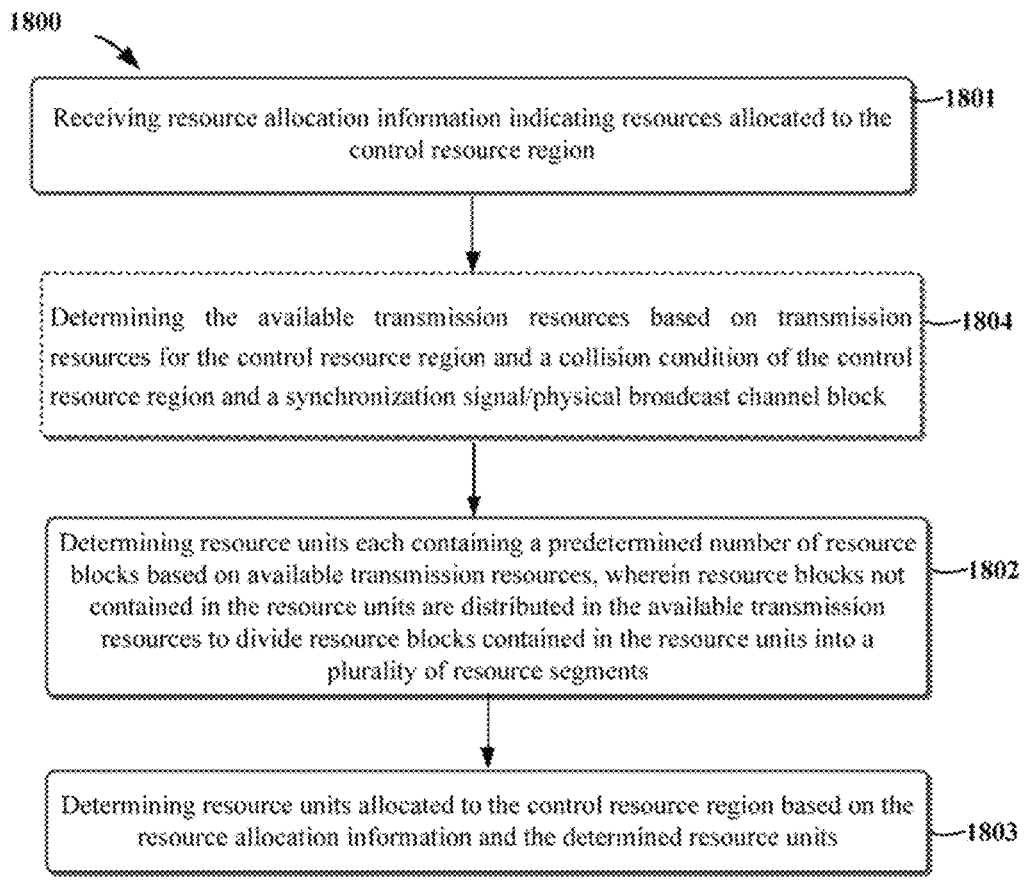
FIG. 17 schematically illustrates example CORESET resource allocation in the time domain according to an embodiment of the present disclosure.
FIG. 18 schematically illustrates a flow chart of a method for determining resources allocated to a control resource region according to an embodiment of the present disclosure.

FIGS. 15 to 17 schematically illustrate the collision avoidance solution wherein the CORESET occupies three symbols. As illustrated in FIG. 15, for the CORESET of three symbols, there are seven collision conditions. Case 1 is a condition that the CORESET starts from the second symbol before symbol 0 within the SS/PBCH block and thus collides with only PSS, case 2 is a condition that the CORESET starts from the symbol immediately before symbol 0 within the SS/PBCH block and thus collides with both PSS and the first PBCH, case 3 is a condition that the CORESET start from symbol 0 within the SS/PBCH block and thus collides with the PSS, the first PBCH and the SSS, case 4 is a condition that the CORESET start from symbol 1 within the SS/PBCH block and thus collides with the first PBCH, the SSS and the second PBCH, case 5 is a condition that the CORESET start from symbol 2 within the SS/PBCH and thus collides with SSS and the second PBCH, case 6 is a condition that the CORESET starts from symbol 3 within the SS/PBCH and thus collides with only the second PBCH, and case 7 is a condition that no collision occurs between CORESET and the SS/PBCH block.

Similarly, a table can be given to list the number of the RB resources occupied by the SS/PBCH block for different collision cases. For illustrative purposes, FIG. 16 illustrates a table of the number of the RB resources occupied by the SS/PBCH block for different collision cases according to an embodiment of the present disclosure. As illustrated in FIG. 16, for case 1, i.e., the CORESET colliding with only PSS, the number of RBs occupied by SS/PBCH block is 12; for case 2 to 6, the CORESET colliding with at least one PBCH, the number of RBs occupied by SS/PBCH block is 24, for other cases of no collision, like case 6, the number of RBs occupied by SS/PBCH block is zero.

FIG. 17 schematically illustrates an example CORESET resource allocation in the time frequency according to an embodiment of the present disclosure. As illustrated in FIG. 17, CORESET 1 occupies symbols 6 to 8, which corresponds to case 1, CORESET 2 occupies symbols 2 to 4, which corresponds to case 3, and CORESET 3 occupies symbols 7 to 9, which corresponds to case 2. Similarly, for each of CORESETs 1 to 3, the network device may refer to the table as illustrated in FIG. 13 to determine the resource occupied by the SS/PBCH block and further determine the available transmission resources for CORESET by excluding the resource occupied by the SS/PBCH block from the BWP.

It shall be noticed that although collision avoidance is proposed during resource allocation, it is also possible to address the collision issue after resource allocation and in such a case, the bandwidth of BWP can be taken as the available resource for the CORESET.

It shall be also noticed that although the COREST with more than one symbol is considered as a whole during resource allocation, the present disclosure is not limited thereto. In fact, for the CORESET with two or three symbols, it is also possible to treat them as two or three CORESTs with one symbol. In other word, the resource allocation can be performed for each of symbols of the CORESETs.

In addition, in another embodiment of the present disclosure, during resource allocation operation of step 202, the resource group size may also be determined by further considering a collision condition of the control resource region and a synchronization signal/physical broadcast channel block. In other words, the available transmission resources may be transmission resources determined based on the to-be-used bandwidth of the BWP and the collision condition of the control resource region as described with reference to FIGS. 9 to 17.

Hereinbefore, solutions for resource allocation for control resource region at the network device are described with reference to FIGS. 2 to 17, and next, solutions for resource determination for control resource region at the terminal device will be described with reference to FIG. 18.

FIG. 18 schematically illustrates a flow chart of a method for resource determination for control resource region in a wireless communication system according to an embodiment of the present disclosure. The method 1800 can be performed at a terminal device, for example UE, or other like terminal devices.

As illustrated in FIG. 18, in step 1801, the terminal device may receive resource allocation information indicating resources allocated to the control resource region from the network device. The resource allocation information indicates resources allocated to the control resource region by the network device. As described hereinbefore, the resource allocation may be in a form of bitmap, each bit of which indicates a corresponding RBG is allocated to the terminal device or not.

Then, in step 1802, the terminal device may determine resource units based on the available transmission resources, like those did by the network device. The resource unit is a basic unit containing a predetermined number of resource blocks. Due to the fact that the total number of available transmission resources may not be a multiple of the predetermined number, serval resource blocks may not be contained within the resource units. Resource blocks not contained in the resource units may be distributed in the available transmission resources and thus divide resource blocks contained in the resource units into a plurality of resource segments.

In an embodiment of the present disclosure, the resource blocks not contained in the resource units may be uniformly distributed in the available transmission resources. In such a way, resource blocks contained in the resource units can be divided into a plurality of equal-length resource segments, as illustrated in FIG. 3A. In addition, indices of resource blocks not contained in the resource units can be further cyclic shifted, as illustrated in FIG. 3B. Or alternatively, the start resource block index of the available transmission resources can be cyclic shifted, as illustrated in FIG. 3C. For details about the resource unit determination, reference could be made to description with reference to FIGS. 3A to 3C.

It shall be noticed that although the resource units can be determined at terminal device for all possible RBs number in the BWP, the present disclosure is not limited thereto. It is also possible to set several predetermined resource unit patterns for several predetermined RB numbers. In such case, the terminal device can learn the resource unit patterns once it learns the RB number of the BWP, without defining them by means of these equations as given herein.

In an embodiment of the present disclosure, if the predetermined number of the RBs is 6, then the total number of resource units within the available resource can be determined as $$N_{unit} = \lfloor N_{RB}^{CORESET}/6 \rfloor$$

wherein "$\lfloor \ \rfloor$" indicates a round down operation. Thus, the resource unit indices $n_{unit}$ can be numbered from 0 to $N_{unit}-1$. In an embodiment of the present disclosure, each resource units includes 6 RBs and for each resource unit, if the resource block is a leftover RB, then the leftover RB can be skipped. As an example, a method of allocated resource determination is given as below:

$j=0$

For $n_{unit}$
For i=0:5 if $(n_{unit}*6+i)=D_j$, $j=j+1$; value=$(n_{unit}*6+i+j)$

Else value=$(n_{unit}*6+i+j)$

In such a way, the terminal device could know RB indexes in the resource units which can be allocated to the CORESET.

Next, in step 1803, the terminal device may determine resource units allocated to the control resource region based on the resource allocation information and the determined resource units. After obtaining the determined resource units, the terminal device may use the indication carried in the resource allocation information to determine which resource units among the determined resource units are allocated to the control resource region. The resource allocation information may be in a form of bitmap, each bit indicating whether a corresponding resource unit is allocated to the control resource region. Thus, by means of such resource allocation information, the terminal device could easily know resource units allocated to the control resource region.

The resource units allocated to the control resource region may be further determined based on a resource group size for the control resource region. The resource group size can be determined based on the available transmission resources, for example by means of tables as illustrated in any of FIGS. 5 to 7. For different resource group sizes, the bitmap may contain different bits. For example, if the group size is 6, one bit may indicate the allocation of a corresponding RBG of 6 bits, if the group size is 12, one bit may indicate the allocation of a corresponding RBG of 12 bits. Thus, the resource group size may be used to determine the resource units allocated to the control resource region.

Further, the available transmission resource for the control resource region can be determined by considering a collision condition of the control resource region and a synchronization signal/physical broadcast channel block. The detailed operation of available transmission resource at the network device may be similar to those at the terminal device and thus will not be elaborated herein. For details, one could refer to the description with reference to FIGS. 9 to 17.

Hereinabove, embodiments of determining resources allocated to a control resource region are described in brief hereinbefore with reference to FIG. 18. However, it can be understood that operations at the terminal device are corresponding to those at the terminal device and thus for some details of operations, one may refer to description with reference to FIGS. 2 to 17.

Figure 19:
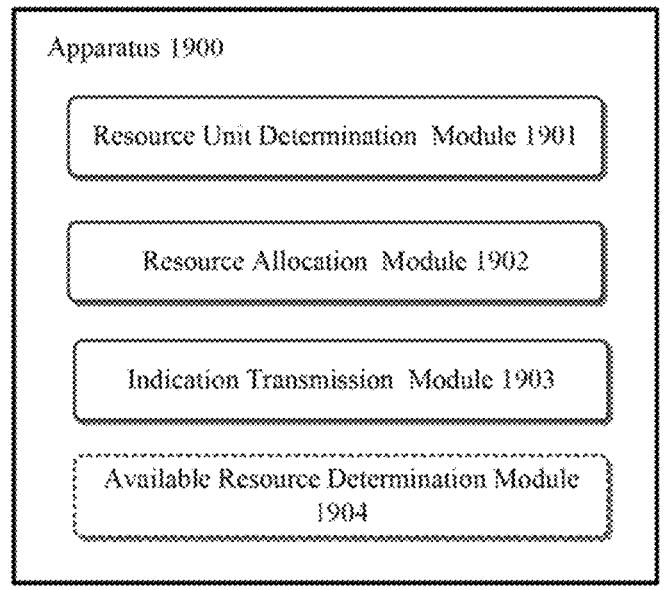
FIG. 19 schematically illustrates a block diagram of an apparatus for resource allocation for control resource region in a wireless communication system according to an embodiment of the present disclosure.

FIG. 19 further schematically illustrates a block diagram of an apparatus for resource allocation for control resource region in a wireless communication system according to an embodiment of the present disclosure. The apparatus 1900 can be implemented at a network device, for example eNB, or other like network devices.

As illustrated in FIG. 1900, the apparatus 1900 may include a resource unit determination module 1901, a resource allocation module 1902 and an indication transmission module 1903. The resource unit determination module 1901 may be configured to determine resource units each containing a predetermined number of resource blocks based on available transmission resources, wherein resource blocks not contained in the resource units are distributed in the available transmission resources to divide resource blocks contained in the resource units into a plurality of resource segments. The resource allocation module 1902 may be configured to allocate one or more of the determined resource units to the control resource region. The indication transmission module 1903 may be configured to transmit resource allocation information indicating the allocated one or more of resource units.

In an embodiment of the present disclosure, the apparatus may further comprise an available resource determination module 1904. The available resource determination module 1904 may be configured to determine the available transmission resources based on transmission resources in a to-be-used bandwidth part and a collision condition of the control resource region and a synchronization signal/physical broadcast channel block.

In another embodiment of the present disclosure, the resource blocks not contained in the resource units may be uniformly distributed in the available transmission resources.

In a further embodiment of the present disclosure, the resource unit determination module may be further configured to perform at least one of: cyclic shifting indices of resource blocks not contained in the resource units; and cyclic shifting a start resource block index of the available transmission resources.

In a still further embodiment of the present disclosure, the resource allocation module 1902 may be further configured to allocate one or more of the determined resource units based on a resource group size for the control resource region, wherein the resource group size is determined based on the available transmission resources.

In a yet still further embodiment of the present disclosure, the resource group size may be determined by further considering a collision condition of the control resource region and a synchronization signal/physical broadcast channel block.

Figure 20:
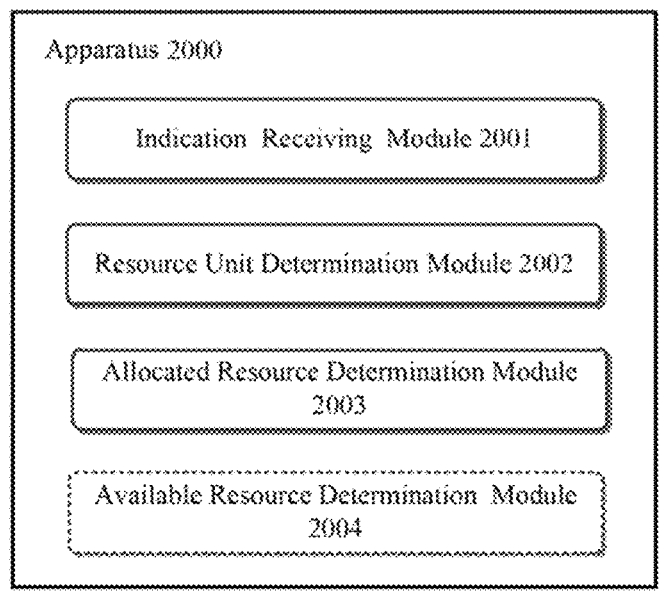
FIG. 20 schematically illustrates a block diagram of an apparatus for determining resources allocated to a control resource region in a wireless communication system according to an embodiment of the present disclosure.

FIG. 20 schematically illustrates a block diagram of an apparatus for determining resources allocated to a control resource region in a wireless communication system according to an embodiment of the present disclosure. The apparatus 2000 may be implemented at a terminal device, for example UE, or other like terminal devices.

As illustrated in FIG. 20, the apparatus 2000 may include an indication receiving module 2001, a resource unit determination module 2002, and an allocated resource determination module 2003. The indication receiving module 2001 is configured to receive resource allocation information indicating resources allocated to the control resource region. The resource unit determination module 2002 is configured to determine resource units each containing a predetermined number of resource blocks based on available transmission resources, wherein resource blocks not contained in the resource units are distributed in the available transmission resources to divide resource blocks contained in the resource units into a plurality of resource segments. The allocated resource determination module 2003 is configured to determine resource units allocated to the control resource region based on the resource allocation information and the determined resource units.

In an embodiment of the present disclosure, the apparatus 2000 may further comprises an available resource determination module 1904. The available resource determination module 1904 may be configured to determine the available transmission resources based on transmission resources in a to-be-used bandwidth part and a collision condition of the control resource region and a synchronization signal/physical broadcast channel block.

In another embodiment of the present disclosure, the resource blocks not contained in the resource units may be uniformly distributed in the available transmission resources.

In another embodiment of the present disclosure, the resource unit determination module 2002 may be further configured to perform at least one of: cyclic shifting indices of resource blocks not contained in the resource units; and cyclic shifting a start resource block index of the available transmission resources.

In a further embodiment of the present disclosure, the allocated resource determination module 2003 may be further configured to determine resource units allocated to the control resource region further based on a resource group size for the control resource region, wherein the resource group size is determined based on the available transmission resources.

In a still further embodiment of the present disclosure, the resource group size may be determined by further considering a collision condition of the control resource region and a synchronization signal/physical broadcast channel block.

Hereinbefore, apparatuses 1900 and 2000 are described with reference to FIGS. 19 and 20 in brief. It can be noted that the apparatuses 1900 and 2000 may be configured to implement functionalities as described with reference to FIGS. 2 to 18. Therefore, for details about the operations of modules in these apparatuses, one may refer to those descriptions made with respect to the respective steps of the methods with reference to FIGS. 2 to 18.

It is further noted that components of the apparatuses 1900 and 2000 may be embodied in hardware, software, firmware, and/or any combination thereof. For example, the components of apparatuses 1900 and 2000 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 1900 and 2000 may include at least one processor. The at least one processor suitable for use with embodiments of the present disclosure may include, by way of example, both general and special purpose processors already known or developed in the future. Apparatuses 1900 and 2000 may further include at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 1900 and 2000 to at least perform operations according to the method as discussed with reference to FIGS. 2 to 18 respectively.

Figure 21:
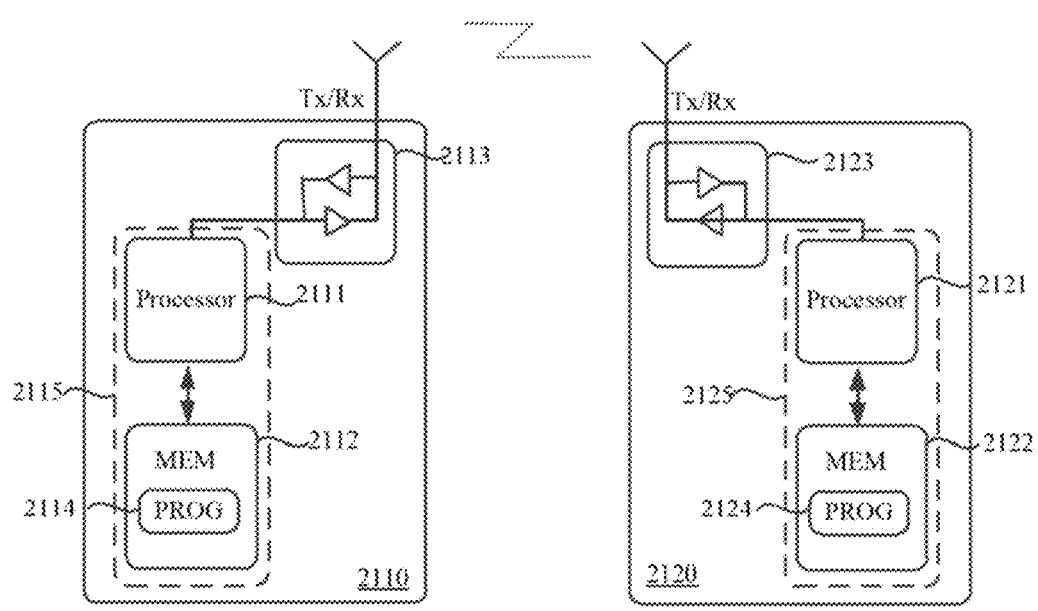
FIG. 21 schematically illustrates a simplified block diagram of an apparatus 2110 that may be embodied as or comprised in a network node like gNB, and an apparatus 2120 that may be embodied as or comprised in a terminal device like UE as described herein.

FIG. 21 schematically illustrates a simplified block diagram of an apparatus 2110 that may be embodied as or comprised in a network node like gNB, and an apparatus 2120 that may be embodied as or comprised in a terminal device like UE as described herein.

The apparatus 2110 comprises at least one processor 2111, such as a data processor (DP) and at least one memory (MEM) 2112 coupled to the processor 2111. The apparatus 2110 may further include a transmitter TX and receiver RX 2113 coupled to the processor 2111, which may be operable to communicatively connect to the apparatus 2120. The MEM 2112 stores a program (PROG) 2114. The PROG 2114 may include instructions that, when executed on the associated processor 2111, enable the apparatus 2110 to operate in accordance with embodiments of the present disclosure, for example method 200. A combination of the at least one processor 2111 and the at least one MEM 2112 may form processing means 2115 adapted to implement various embodiments of the present disclosure.

The apparatus 2120 comprises at least one processor 2211, such as a DP, and at least one MEM 2122 coupled to the processor 2211. The apparatus 2120 may further include a suitable TX/RX 2123 coupled to the processor 2211, which may be operable for wireless communication with the apparatus 2110. The MEM 2122 stores a PROG 2124. The PROG 2124 may include instructions that, when executed on the associated processor 2211, enable the apparatus 2120 to operate in accordance with the embodiments of the present disclosure, for example to perform method 1800. A combination of the at least one processor 2211 and the at least one MEM 2122 may form processing means 2125 adapted to implement various embodiments of the present disclosure.

Various embodiments of the present disclosure may be implemented by computer program executable by one or more of the processors 2111, 2211, software, firmware, hardware or in a combination thereof.

The MEMs 2112 and 2122 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2111 and 2211 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method, comprising:
   transmitting resource allocation information indicating a plurality of resource units allocated to a control resource region,
   wherein each of the plurality of resource units contains 6 resource blocks, and the plurality of resource units allocated to the control resource region belong to at least one resource segment, wherein first resource blocks not contained in the plurality of resource units are distributed in a bandwidth part (BWP) to divide second resource blocks in the BWP into a plurality of resource segments each containing a plurality of resource units.

2. The method of claim 1, wherein the plurality of resource units allocated to the control resource region are not overlapped with third resource blocks for a synchronization signal/physical broadcast channel block.

3. The method of claim 1, wherein the resource allocation information is indicated by a bitmap.

4. The method of claim 1, wherein size of the plurality of resource segments is equal.

5. A method, comprising:
   receiving resource allocation information indicating resources allocated to a control resource region; and
   determining a plurality of resource units allocated to the control resource region in a bandwidth part (BWP) based on the resource allocation information,
   wherein each of the plurality of resource units contains 6 resource blocks, and the plurality of resource units allocated to the control resource region belong to at least one resource segment, wherein first resource blocks not contained in the plurality of resource units are distributed in the BWP to divide second resource blocks in the BWP into a plurality of resource segments each containing a plurality of resource units.

6. The method of claim 5, wherein the plurality of resource units allocated to the control resource region are not overlapped with third resource blocks for a synchronization signal/physical broadcast channel block.

7. The method of claim 5, wherein the resource allocation information is indicated by a bitmap.

8. The method of claim 5, wherein size of the plurality of resource segments is equal.

9. A network device, comprising:
   a transceiver;
   a processor coupled to the transceiver and configured to:
   transmit resource allocation information indicating a plurality of resource units allocated to a control resource region,
   wherein each of the plurality of resource units contains 6 resource blocks, and the plurality of resource units allocated to the control resource region belong to at least one resource segment, wherein first resource blocks not contained in the plurality of resource units are distributed in a bandwidth part (BWP) to divide second resource blocks in the BWP into a plurality of resource segments each containing a plurality of resource units.

10. The network device of claim 9, wherein the plurality of resource units allocated to the control resource region are not overlapped with third resource blocks for a synchronization signal/physical broadcast channel block.

11. The network device of claim 9, wherein the resource allocation information is indicated by a bitmap.

12. The network device of claim 9, wherein size of the plurality of resource segments is equal.

13. A terminal device, comprising:
    a transceiver configured to:
    receive resource allocation information indicating resources allocated to a control resource region;
    a processor configured to:
    determine a plurality of resource units allocated to the control resource region in a bandwidth part (BWP) based on the resource allocation information,
    wherein each of the plurality of resource units contains 6 resource blocks, and the plurality of resource units allocated to the control resource region belong to at least one resource segment, wherein first resource blocks not contained in the plurality of resource units are distributed in the BWP to divide second resource blocks in the BWP into a plurality of resource segments each containing a plurality of resource units.

14. The terminal device of claim 13, wherein the plurality of resource units allocated to the control resource region are not overlapped with third resource blocks for a synchronization signal/physical broadcast channel block.

15. The terminal device of claim 13, wherein the resource allocation information is indicated by a bitmap.

16. The terminal device of claim 13, wherein size of the plurality of resource segments is equal.

17. A method performed by a terminal device, comprising:
    receiving resource allocation information for a control resource set (CORESET) in a bandwidth part (BWP), the resource allocation information indicating a plurality of resource units allocated for the CORESET, wherein the BWP further comprises a plurality of resource blocks not for the CORESET, and wherein the plurality of resource blocks divides the BWP into a plurality of resource segments each containing a plurality of resource units; and
    receiving downlink control information based on the resource allocation information,
    wherein each of the plurality of resource units contains 6 resource blocks.

18. The method of claim 17, wherein size of the plurality of resource segments is equal.

* * * * *